United States Patent
Su

(10) Patent No.: US 10,083,141 B2
(45) Date of Patent: Sep. 25, 2018

(54) COMPUTER SYSTEM AND METHOD FOR ACCESSING ENDPOINT DEVICE IN COMPUTER SYSTEM

(71) Applicant: HUAWEI TECHNOLOGIES CO., LTD., Shenzhen, Guangdong (CN)

(72) Inventor: Dexian Su, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/885,507

(22) Filed: Jan. 31, 2018

(65) Prior Publication Data

US 2018/0225246 A1 Aug. 9, 2018

Related U.S. Application Data

(63) Continuation of application No. PCT/CN2015/090144, filed on Sep. 21, 2015.

(51) Int. Cl.
| | | |
|---|---|---|
| *G06F 13/40* | (2006.01) | |
| *G06F 13/42* | (2006.01) | |
| *G06F 9/44* | (2018.01) | |
| *G06F 9/4401* | (2018.01) | |

(52) U.S. Cl.
CPC ........ *G06F 13/4022* (2013.01); *G06F 9/4403* (2013.01); *G06F 13/4282* (2013.01); *G06F 2213/0016* (2013.01); *G06F 2213/0026* (2013.01)

(58) Field of Classification Search
CPC .......................... G06F 13/4022; G06F 13/4282
See application file for complete search history.

(56) References Cited

U.S. PATENT DOCUMENTS

| | | | |
|---|---|---|---|
| 8,737,575 B1 | 5/2014 | Croak et al. | |
| 9,690,739 B2* | 6/2017 | Shao | G06F 13/4221 |
| 9,864,701 B1* | 1/2018 | Khan | G06F 12/1081 |

(Continued)

FOREIGN PATENT DOCUMENTS

| | | |
|---|---|---|
| CN | 101124565 A | 2/2008 |
| CN | 103069771 A | 4/2013 |

(Continued)

*Primary Examiner* — Tim T Vo
*Assistant Examiner* — Phong H Dang
(74) *Attorney, Agent, or Firm* — Huawei Technologies Co., Ltd.

(57) ABSTRACT

Embodiments of the present invention provide a method for accessing an endpoint device in a computer system and a computer system. According to the present invention, an endpoint proxy device establishes a correspondence between a first address, of an endpoint device, in the computing subsystem and a second address, of the endpoint device, in the management subsystem, and when receiving a first access request sent by a management controller to the endpoint device, generates, according to the correspondence, a second access request that carries the first address, of the endpoint device, in the computing subsystem, and sends the second access request to the endpoint device. Therefore, an endpoint device access request of the management controller is sent to the endpoint device, an operation does not need to depend on an operating system, and maintainability in managing the endpoint device is improved.

20 Claims, 6 Drawing Sheets

(56) References Cited

U.S. PATENT DOCUMENTS

| | | | |
|---|---|---|---|
| 2002/0152335 A1* | 10/2002 | Holm | G06F 12/0684 |
| | | | 710/8 |
| 2006/0155862 A1 | 7/2006 | Kathi et al. | |
| 2008/0046628 A1* | 2/2008 | Hunsaker | G06F 13/423 |
| | | | 710/315 |
| 2009/0248947 A1* | 10/2009 | Malwankar | G06F 13/404 |
| | | | 710/316 |
| 2010/0313095 A1 | 12/2010 | Dinan | |
| 2010/0329285 A1 | 12/2010 | Stanton et al. | |
| 2012/0166690 A1* | 6/2012 | Regula | G06F 13/404 |
| | | | 710/104 |
| 2014/0331000 A1 | 11/2014 | Du | |
| 2015/0067229 A1 | 3/2015 | Connor et al. | |
| 2015/0078202 A1 | 3/2015 | Joshi et al. | |
| 2015/0082080 A1* | 3/2015 | Lin | G06F 11/0745 |
| | | | 714/5.1 |
| 2015/0096051 A1 | 4/2015 | Natu et al. | |
| 2016/0011985 A1* | 1/2016 | Swaine | G06F 12/1009 |
| | | | 711/206 |

FOREIGN PATENT DOCUMENTS

| | | |
|---|---|---|
| CN | 103581607 A | 2/2014 |
| CN | 103609195 A | 2/2014 |
| EP | 2696591 A2 | 2/2014 |
| JP | 2011048452 A | 3/2011 |
| WO | 02102012 A2 | 12/2002 |

* cited by examiner

```
┌─────────────────────────────────────────────────────┐
│   A central processing unit allocates device        │
│ information in a computing subsystem to an endpoint │
│ device, and writes the device information, of the   │
│ endpoint device, in the computing subsystem into an │──── 900
│ endpoint proxy device in the computing subsystem,   │
│ where the device information, of the endpoint       │
│ device, in the computing subsystem includes at      │
│ least first address information, of the endpoint    │
│ device, in the computing subsystem                  │
└─────────────────────────────────────────────────────┘
                          │
┌─────────────────────────────────────────────────────┐
│  After determining that the device information, of  │
│  the endpoint device, in the computing subsystem is │
│  written into the endpoint proxy device, a          │
│  management controller allocates a second address,  │
│  of the endpoint device, in a management subsystem  │──── 902
│  according to a first address, of the endpoint      │
│  device, in the computing subsystem, and writes the │
│  second address, of the endpoint device, in the     │
│  management subsystem into the endpoint proxy device│
└─────────────────────────────────────────────────────┘
                          │
┌─────────────────────────────────────────────────────┐
│ After the second address is written into the        │
│ endpoint proxy device, the endpoint proxy device    │
│ establishes a correspondence between the first      │
│ address, of the endpoint device, in the computing   │
│ subsystem and the second address, of the endpoint   │
│ device, in the management subsystem, where a first  │──── 904
│ port of the endpoint proxy device is connected to   │
│ the central processing unit in the computing        │
│ subsystem by using a PCIE link, and a second port   │
│ of the endpoint proxy device is connected to the    │
│ management controller in the management subsystem   │
└─────────────────────────────────────────────────────┘
                          │
┌─────────────────────────────────────────────────────┐
│ The management controller sends a first access      │
│ request, where the first access request instructs   │
│ to manage and configure the endpoint device by      │──── 906
│ using the endpoint proxy device, and carries the    │
│ second address, of the endpoint device, in the      │
│ management subsystem                                │
└─────────────────────────────────────────────────────┘
                          │
┌─────────────────────────────────────────────────────┐
│ The endpoint proxy device receives, by means of the │
│ connection between the second port and the          │
│ management controller, the first access request     │
│ sent by the management controller, generates,       │
│ according to the correspondence, a second access    │──── 908
│ request that carries the first address, of the      │
│ endpoint device, in the computing subsystem, and    │
│ sends the second access request to the endpoint     │
│ device by using the PCIE link connected to the      │
│ first port                                          │
└─────────────────────────────────────────────────────┘
```

FIG. 9

COMPUTER SYSTEM AND METHOD FOR ACCESSING ENDPOINT DEVICE IN COMPUTER SYSTEM

CROSS-REFERENCE TO RELATED APPLICATIONS

This application is a continuation of International Application No. PCT/CN2015/090144, filed on Sep. 21, 2015, which is hereby incorporated by reference in its entirety.

TECHNICAL FIELD

The present invention relates to the field of information technologies, and in particular, to a method for accessing an endpoint device in a computer system and a computer system.

BACKGROUND

In a data center, generally, an Ethernet technology is used to construct a local area network, and a fiber channel (FC) technology is used to construct a storage area network based on SAN protocols (SAN). A computer device, namely a computer based Ethernet network adapter is used to access the local area network, and a fiber channel host bus adapter host bus adapter (HBA) is used to access the SAN. Multiple types of interface cards and network devices reduce service flexibility, increase network management complexity of the data center, and increase device costs and expenditures in aspects of electric power and the like. A fiber channel over Ethernet (FCoE) enables an Ethernet frame to carry a FC frame, so that an FC SAN and an Ethernet local area network can share a same single integrated network infrastructure. Thus, a problem brought by coexistence of different types of networks is resolved, and an objective of network infrastructure integration and simplification is achieved.

In a computer device, a network adapter, a redundant array of independent disks (RAID) card, a solid state drive (SSD) card, a graphics processing unit (GPU) card, and the and other similar devices are most commonly used as peripheral component interconnect express (PCIE) endpoint devices.

In the prior art, a management subsystem of a computer device configures and manages each PCIE endpoint device by communicating with multiple management software modules that run on an operating system, and each management software module manages each corresponding PCIE endpoint device respectively. To configure and manage multiple different types of PCIE endpoint devices, multiple management software modules need to be deployed, which leads to complicated deployment and difficulty in subsequent upgrade and maintenance.

SUMMARY

Embodiments of the present disclosure provide a method for accessing an endpoint device in a computer system and a computer system, to implement configuration and management on an endpoint device without depending on an operating system.

According to a first aspect of the embodiments of the present disclosure, a computer system is provided, including a computing subsystem and a management subsystem, where the computing subsystem includes a central processing unit, the management subsystem includes a management controller, and the central processing unit is configured to connect to an endpoint device;

the computer system further includes an endpoint proxy device, a first port of the endpoint proxy device is connected to the central processing unit in the computing subsystem using a peripheral component interconnect express (PCIE) link, and a second port of the endpoint proxy device is connected to the management controller in the management subsystem;

the central processing unit is configured to: allocate device information, of the endpoint device, in the computing subsystem, and write the device information, of the endpoint device, in the computing subsystem into the endpoint proxy device, where the device information, of the endpoint device, in the computing subsystem includes a first address information, of the endpoint device, in the computing subsystem;

the management controller is configured to: after determining that the device information, of the endpoint device, in the computing subsystem is written into the endpoint proxy device, allocate a second address, of the endpoint device, in the management subsystem according to a first address, of the endpoint device, in the computing subsystem, and write the second address, of the endpoint device, in the management subsystem into the endpoint proxy device;

the endpoint proxy device is configured to: after the second address is written into the endpoint proxy device, establish a correspondence between the first address, of the endpoint device, in the computing subsystem and the second address, of the endpoint device, in the management subsystem;

the management controller is further configured to send a first access request, where the first access request carries the second address, of the endpoint device, in the management subsystem; and the endpoint proxy device is further configured to: receive, by means of the connection between the second port and the management controller, the first access request sent by the management controller, generate, according to the correspondence, a second access request that carries the first address, of the endpoint device, in the computing subsystem, and send the second access request to the endpoint device using the PCIE link connected to the first port.

With reference to the first aspect of the embodiments of the present disclosure, in a first possible implementation manner of the first aspect of the embodiments of the present disclosure, the central processing unit is specifically configured to: scan the endpoint device and the endpoint proxy device according to a basic input/output system BIOS instruction in an initialization process of the computing subsystem, separately allocate device information in the computing subsystem to the endpoint device and the endpoint proxy device, and write the device information, of the endpoint device, in the computing subsystem into the endpoint proxy device.

With reference to the first possible implementation manner of the first aspect of the embodiments of the present disclosure, in a second possible implementation manner of the first aspect of the embodiments of the present disclosure, the central processing unit is specifically configured to write the device information, of the endpoint device, in the computing subsystem into the endpoint proxy device according to the allocated device information, of the endpoint proxy device, in the computing subsystem using the PCIE link connected to the first port.

With reference to the first possible implementation manner of the first aspect of the embodiments of the present disclosure, in a third possible implementation manner of the first aspect of the embodiments of the present disclosure, the management controller is connected to the central processing unit using a south bridge chip;

the central processing unit is specifically configured to notify the device information, of the endpoint device, in the computing subsystem to the management controller using the south bridge chip; and the management controller is further configured to write the acquired device information, of the endpoint device, in the computing subsystem into the endpoint proxy device by means of the connection to the second port.

With reference to the first, second, and third possible implementation manners of the first aspect of the embodiments of the present disclosure, in a fourth possible implementation manner of the first aspect of the embodiments of the present disclosure, the endpoint proxy device is further configured to send a notification message to the management controller after the device information, of the endpoint device, in the computing subsystem is written into the endpoint proxy device; and the management controller is specifically configured to: receive the notification message sent by the endpoint proxy device, and determine, according to the notification message, that the device information, of the endpoint device, in the computing subsystem is written into the endpoint proxy device.

With reference to the first, second, and third possible implementation manners of the first aspect of the embodiments of the present disclosure, in a fifth possible implementation manner of the first aspect of the embodiments of the present disclosure, the management controller is specifically configured to: periodically send a query message to the endpoint proxy device, receive a response message sent by the endpoint proxy device in response to the query message, and determine, according to the response message in response to the query message, that the device information, of the endpoint device, in the computing subsystem is written into the endpoint proxy device.

With reference to the first to fifth possible implementation manners of the first aspect of the embodiments of the present disclosure, in a sixth possible implementation manner of the first aspect of the embodiments of the present disclosure, the second port of the endpoint proxy device is connected to the management controller in the management subsystem using an inter-integrated circuit I2C;

the management controller is further configured to allocate an I2C number to the endpoint proxy device; and the management controller is specifically configured to send the first access request to the endpoint proxy device according to the I2C number of the endpoint proxy device.

With reference to the first to fifth possible implementation manners of the first aspect of the embodiments of the present disclosure, in a seventh possible implementation manner of the first aspect of the embodiments of the present disclosure, the second port of the endpoint proxy device is connected to the management controller in the management subsystem using a PCIE link;

the management controller is further configured to allocate a second address, of the endpoint proxy device, in the management subsystem, where a range of the second address, of the endpoint proxy device, in the management subsystem includes a range of the second address, of the endpoint device, in the management subsystem; and the management controller is specifically configured to send the first access request to the endpoint proxy device according to the second address, of the endpoint device, in the management subsystem.

With reference to the first to seventh possible implementation manners of the first aspect of the embodiments of the present disclosure, in an eighth possible implementation manner of the first aspect of the embodiments of the present disclosure, the computing subsystem further includes a PCIE switching device, and the endpoint device is connected to the central processing unit using the PCIE switching device; and the first port of the endpoint proxy device is connected to the PCIE switching device using the PCIE link so as to connect to the central processing unit.

With reference to the first to eighth possible implementation manners of the first aspect of the embodiments of the present disclosure, in a ninth possible implementation manner of the first aspect of the embodiments of the present disclosure, the endpoint proxy device is located in the computing subsystem; or the endpoint proxy device is located in the management controller in the management subsystem.

With reference to the first to ninth possible implementation manners of the first aspect of the embodiments of the present disclosure, in a tenth possible implementation manner of the first aspect of the embodiments of the present disclosure, the device information, of the endpoint device, in the computing subsystem includes at least one piece of the following information:

input/output I/O address information of the endpoint device, memory address information of the endpoint device, a bus/device/function B/D/F number of the endpoint device, or device type information of the endpoint device.

According to a second aspect of the embodiments of the present disclosure, a method for accessing an endpoint device in a computer system is provided, wherein the method is applied to the computer system, and the computer system includes a computing subsystem and a management subsystem, where the computing subsystem includes a central processing unit, the management subsystem includes a management controller, the central processing unit is configured to connect to an endpoint device, and the method includes:

allocating, by the central processing unit, device information in the computing subsystem to the endpoint device, and writing the device information, of the endpoint device, in the computing subsystem into an endpoint proxy device in the computing subsystem, where the device information, of the endpoint device, in the computing subsystem includes a first address information, of the endpoint device, in the computing subsystem;

after determining that the device information, of the endpoint device, in the computing subsystem is written into the endpoint proxy device, allocating, by the management controller, a second address, of the endpoint device, in the management subsystem according to a first address, of the endpoint device, in the computing subsystem, and writing the second address, of the endpoint device, in the management subsystem into the endpoint proxy device;

after the second address is written into the endpoint proxy device, establishing, by the endpoint proxy device, a correspondence between the first address, of the endpoint device, in the computing subsystem and the second address, of the endpoint device, in the management subsystem, where a first port of the endpoint proxy device is connected to the central processing unit in the computing subsystem using a PCIE link, and a second port of the endpoint proxy device is connected to the management controller in the management subsystem;

sending, by the management controller, a first access request, where the first access request carries the second address, of the endpoint device, in the management subsystem; and receiving, by the endpoint proxy device by means of the connection between the second port and the management controller, the first access request sent by the management controller, generating, according to the correspondence, a second access request that carries the first address, of the endpoint device, in the computing subsystem, and sending the second access request to the endpoint device using the PCIE link connected to the first port.

With reference to the second aspect of the embodiments of the present disclosure, in a first possible implementation manner of the second aspect of the embodiments of the present disclosure, the method further includes:

scanning, by the central processing unit, the endpoint device and the endpoint proxy device according to a basic input/output system BIOS instruction in an initialization process of the computing subsystem, separately allocating device information in the computing subsystem to the endpoint device and the endpoint proxy device, and writing the device information, of the endpoint device, in the computing subsystem into the endpoint proxy device.

With reference to the first possible implementation manner of the second aspect of the embodiments of the present disclosure, in a second possible implementation manner of the second aspect of the embodiments of the present disclosure, the method further includes:

writing, by the central processing unit, the device information, of the endpoint device, in the computing subsystem into the endpoint proxy device according to the allocated device information, of the endpoint proxy device, in the computing subsystem using the PCIE link connected to the first port.

With reference to the first possible implementation manner of the second aspect of the embodiments of the present disclosure, in a third possible implementation manner of the second aspect of the embodiments of the present disclosure, the management controller is connected to the central processing unit using a south bridge chip, and the method further includes:

notifying, by the central processing unit, the device information, of the endpoint device, in the computing subsystem to the management controller using the south bridge chip; and writing, by the management controller, the acquired device information, of the endpoint device, in the computing subsystem into the endpoint proxy device by means of the connection to the second port.

With reference to the first, second, and third possible implementation manners of the second aspect of the embodiments of the present disclosure, in a fourth possible implementation manner of the second aspect of the embodiments of the present disclosure, the method further includes:

sending, by the endpoint proxy device, a notification message to the management controller after the device information, of the endpoint device, in the computing subsystem is written into the endpoint proxy device; and receiving, by the management controller, the notification message sent by the endpoint proxy device, and determining, according to the notification message, that the device information, of the endpoint device, in the computing subsystem is written into the endpoint proxy device.

With reference to the first, second, and third possible implementation manners of the second aspect of the embodiments of the present disclosure, in a fifth possible implementation manner of the second aspect of the embodiments of the present disclosure, the method further includes:

periodically sending, by the management controller, a query message to the endpoint proxy device, receiving a response message sent by the endpoint proxy device in response to the query message, and determining, according to the response message in response to the query message, that the device information, of the endpoint device, in the computing subsystem is written into the endpoint proxy device.

With reference to the first to fifth possible implementation manners of the second aspect of the embodiments of the present disclosure, in a sixth possible implementation manner of the second aspect of the embodiments of the present disclosure, the second port of the endpoint proxy device is connected to the management controller in the management subsystem using an inter-integrated circuit I2C, and the method further includes:

allocating, by the management controller, an I2C number to the endpoint proxy device; and sending, by the management controller, the first access request to the endpoint proxy device according to the I2C number of the endpoint proxy device.

With reference to the first to fifth possible implementation manners of the second aspect of the embodiments of the present disclosure, in a seventh possible implementation manner of the second aspect of the embodiments of the present disclosure, the second port of the endpoint proxy device is connected to the management controller in the management subsystem using the PCIE link, and the method further includes:

allocating, by the management controller, a second address, of the endpoint proxy device, in the management subsystem, where a range of the second address, of the endpoint proxy device, in the management subsystem includes a range of the second address, of the endpoint device, in the management subsystem; and sending, by the management controller, the first access request to the endpoint proxy device according to the second address, of the endpoint device, in the management subsystem.

With reference to the first to seventh possible implementation manners of the second aspect of the embodiments of the present disclosure, in an eighth possible implementation manner of the second aspect of the embodiments of the present disclosure, the computing subsystem further includes a PCIE switching device, and the endpoint device is connected to the central processing unit using the PCIE switching device; and the first port of the endpoint proxy device is connected to the PCIE switching device using the PCIE link so as to connect to the central processing unit.

With reference to the first to eighth possible implementation manners of the second aspect of the embodiments of the present disclosure, in a ninth possible implementation manner of the second aspect of the embodiments of the present disclosure, the endpoint proxy device is located in the computing subsystem; or the endpoint proxy device is located in the management controller in the management subsystem.

With reference to the first to ninth possible implementation manners of the second aspect of the embodiments of the present disclosure, in a tenth possible implementation manner of the second aspect of the embodiments of the present disclosure, the device information, of the endpoint device, in the computing subsystem includes at least one piece of the following information:

input/output I/O address information of the endpoint device, memory address information of the endpoint device, a bus/device/function B/D/F number of the endpoint device, or device type information of the endpoint device.

According to the method for accessing an endpoint device in a computer system and the computer system, an endpoint proxy device establishes a correspondence between a first address, of an endpoint device, in the computing subsystem and a second address, of the endpoint device, in the management subsystem, and when receiving a first access request sent by a management controller to the endpoint device, generates, according to the correspondence, a second access request that carries the first address, of the endpoint device, in the computing subsystem, and sends the second access request to the endpoint device. Therefore, an endpoint device access request of the management controller is sent to the endpoint device, an operation does not need to depend on an operating system, different endpoint devices do not need to be managed or configured differently, and maintainability in managing the endpoint device is improved.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 9 is a schematic flowchart of a method for accessing an endpoint device in a computer system according to an embodiment of the present disclosure.

DESCRIPTION OF EMBODIMENTS

The following are descriptions of the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the scope of the present disclosure.

Figure 1:
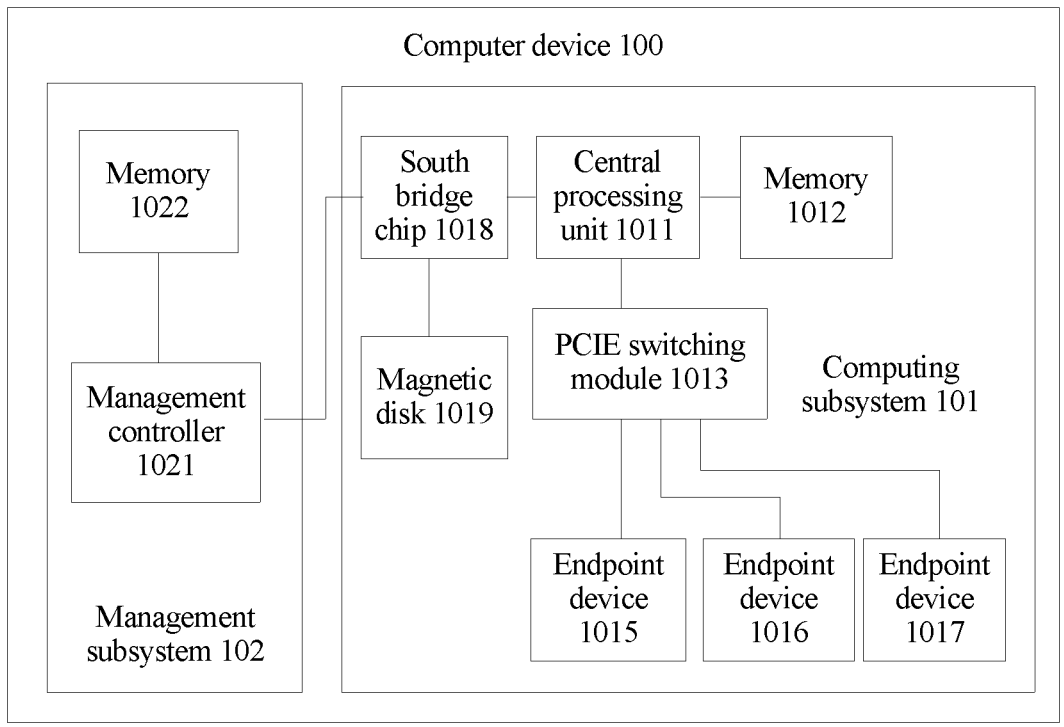
FIG. 1 is a schematic diagram of a basic structure of a computer device in the prior art.

FIG. 1 is a schematic diagram of a basic structure of a computer device in the prior art. Referring to FIG. 1, a computer device 100 includes a computing subsystem 101 and a management subsystem 102. The computing subsystem 101 includes one or more central processing units (CPUs) 1011. Multiple CPUs are connected using a CPU bus or an interconnection chip, and each CPU can access all devices in a system. Here, CPU 1011 in the computing subsystem is connected to a memory 1012 that provides storage space for an operating system. The CPU 1011 in the computing subsystem is connected, directly or using a PCIE link, to one or more PCIE endpoint devices using a PCIE switching module 1013, to extend functions of the computing subsystem. For example, a network adapter used as an endpoint device 1015 provides an Ethernet access capability, a RAID card used as an endpoint device 1016 provides a storage redundancy function, and a GPU card used as an endpoint device 1017 provides a graphic output capability. Different computer devices may also be designed as required, to enable a user to choose a type of an extended terminal device. The CPU in the computing subsystem is connected to a magnetic disk 1019 using a south bridge chip 1018 or directly (in an example of FIG. 1, the CPU is connected the magnetic disk 1019 using the south bridge chip 1018), where the magnetic disk 1019 is generally used as a system storage device. After the computing subsystem is powered on, the CPU such as an active CPU 1011 in the computing subsystem may run a fixed basic input/output system (BIOS) program, and the BIOS completes computing subsystem hardware initialization, PCIE endpoint device discovery and configuration, operating system loading, and the like. After the operating system is started, the computing subsystem is controlled by the loaded operating system.

In the prior art, the computer device 100 includes various computer devices that have a computing or storage function, or may include various servers such as a blade server and a rack server, or may include servers that use various operating systems such as a server that uses a Windows or Linux operating system.

A management controller MCPU 1021 is an execution part of the management subsystem, collects running information and fault information of each part of the computer device 100 using various sensors, and configures and manages the endpoint device in the computer device 100, for example, configures or manages a level of a RAID card, configures or manages a MAC address of a network adapter, and configures or manages a physical function (PF). The MCPU 1021 is connected to the south bridge chip 1018 in the computing subsystem, or is directly connected to the computing CPU 1011, to implement a KVM function or implement communication between the computing subsystem 101 and the management subsystem 102.

After the computer device 100 is powered on, the management subsystem 102 is powered on first. After the management subsystem 102 is powered on and initialized, the management subsystem 102 controls the computing subsystem 101 to get powered on. After the computing subsystem 101 is powered on and completes hardware detection and operating system startup, the computer device 100 starts running.

The BIOS program is a program stored on the computer device, and runs after the computing subsystem of the computer device is powered on. The CPU of the computer device invokes the BIOS program for running. After running, the BIOS primarily implements three functions, which are separately described as follows:

The first function is detecting a hardware part after the computing subsystem of the computer device is powered on, which is also known as power on self test (POST). This function is to check whether the computer device is good. Generally, a complete POST includes tests on a CPU, a basic memory, an extended memory, a mainboard, a CMOS memory, a serial/parallel port, a display adapter, a floppy/hard disk subsystem, a keyboard, and the like. Once a problem is found in the self test, the system gives prompt information or a sound warning. If an error is found in the self test, the error is handled in two manners: For a serious fault (critical fault), the system is powered off, and in this case, no prompt or signal can be given because various initialization operations have not been completed; and for an unserious fault, a prompt or a sound alarm signal is given to wait for user handling.

The second function is initialization, which includes creating an interrupt vector, setting a register, and initializing and detecting external devices such as a PCIE endpoint device; in a process of scanning and initializing the PCIE endpoint device, a depth first algorithm is generally used to discover all PCIE endpoint devices in the computer device, and allocate a bus/device/function (B/D/F) number, I/O address space, and Memory address space to each PCIE endpoint device.

The third function is program booting, that is, booting and starting up an operating system. The BIOS first reads a boot record from a starting sector of a floppy disk or a hard disk. If no boot record is found, a display screen displays absence of a boot device. If a boot record is found, a control right of a computer is handed over to the boot record, and the operating system is loaded into the computer device according to the boot record. After the computer device is started, the BIOS program completes running, and a control right of the computing subsystem is handed over to the operating system loaded according to the boot record, and a program of the operating system is run.

In the prior art, when configuring and managing the PCIE endpoint device, the management subsystem of the computer device implements configuration and management on each PCIE endpoint device by communicating with multiple management software modules that run in the operating system, and each management software module manages each corresponding PCIE endpoint device respectively. To configure and manage multiple different types of PCIE endpoint devices, multiple management software modules need to be deployed, and each management software module itself needs to be provided by each PCIE device manufacturer or developed by a server manufacturer for each PCIE device (to adapt to different operating system types), which leads to complicated deployment and difficulty in subsequent upgrade and maintenance.

A technical solution provided in embodiments of the present disclosure improves the foregoing computer device 100, and resolves a problem in the prior art that implementation of endpoint device management needs to depend on an operating system, so as to improve maintainability when a management subsystem of a computer device manages a PCIE endpoint device.

Figure 2:
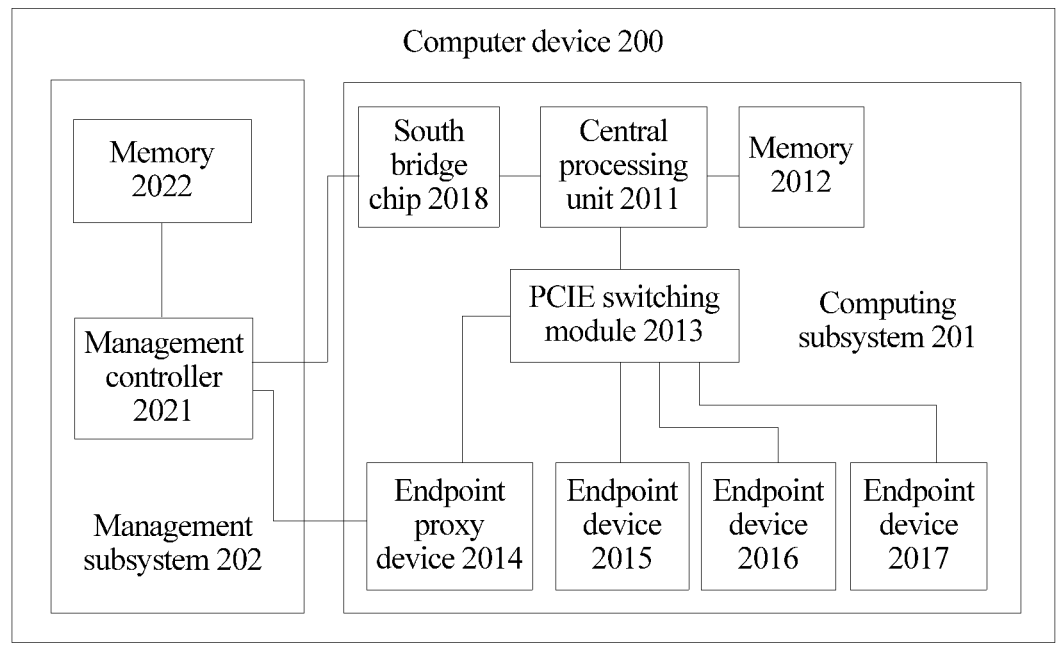
FIG. 2 is a schematic structural diagram of a computer device 200 according to an embodiment of the present disclosure.

FIG. 2 is a schematic structural diagram of a computer device 200 according to an embodiment of the present disclosure. Referring to FIG. 2, the computer device 200 includes a computing subsystem 201 and a management subsystem 202. The computing subsystem 201 includes a central processing unit 2011, a memory 2012, a PCIE switching module 2013, an endpoint device 2015, an endpoint device 2016, an endpoint device 2017, a south bridge chip 2018, and the like; the management subsystem 202 includes a management controller 2021 and a memory 2022.

In this embodiment of the present disclosure, an endpoint proxy device 2014 such as a PCIE endpoint proxy device is added to the computer device 200. The endpoint proxy device 2014 may be a chip, a part of a processor, an independent endpoint device (such as a device card), or the like. The endpoint proxy device 2014 is separately connected to the management controller 2021 and the PCIE switching module 2013.

The endpoint proxy device 2014 may be connected to the CPU 2011 using a PCIE link and using the PCIE switching module in the computing subsystem 201, or may be directly connected to the CPU 2011, or may be directly connected to the south bridge chip 2018. For example, a first port (a PCIE port) of the endpoint proxy device 2014 is connected to the CPU 2011 using the PCIE link, or a first port (a PCIE port) of the endpoint proxy device 2014 is connected to the CPU 2011 using the PCIE link and using the PCIE switching module. FIG. 2 is described using an example in which the endpoint proxy device 2014 is connected to the CPU 2011 using the PCIE switching module.

The endpoint proxy device 2014 is connected to the management controller 2021 in the management subsystem 202 using a standard bus or a private bus (such as a PCIE bus). For example, a second port (a PCIE port) of the endpoint proxy device 2014 is connected to the management controller 2021 in the management subsystem 202 using a PCIE link, or a second port (an I2C port) of the endpoint proxy device 2014 is connected to the management controller 2021 in the management subsystem 202 using an I2C link. The management controller 2021 indirectly accesses the endpoint device such as the endpoint device 2015 in the computing subsystem 201 using the endpoint proxy device 2014, implements out-band configuration (including but without being limited to: configuring a level of a RAID card, a MAC address of a network adapter, a PF type, and the like), and monitors running states of all endpoint devices in the system (including but without being limited to: monitoring a health state of a hard disk in the RAID card, a network adapter link state a statistics counter, and the like), so as to implement an effect of in-band management of endpoint devices on the CPU in the computing subsystem 201 using a management tool without depending on an operating system of the computer device. Dependence on the outside is reduced, different endpoint devices do not need to be managed or configured differently, each management software module does not need to be provided by each PCIE device manufacturer or developed by a server manufacturer for each PCIE device, and maintainability of the computer device is enhanced.

It should be noted that the first port and the second port are not shown in the figure. It should be understood that the first port and the second port are ports of the endpoint proxy device, and may be specifically implemented in multiple implementation manners that include but are not limited to a specific hardware interface, or a software interface that has a communication function. A specific implementation manner of the port is not limited in this embodiment of the present disclosure.

Optionally, like the endpoint device (such as the endpoint device 2015) in the computer device, the endpoint proxy device 2014 in this embodiment of the present disclosure communicates in compliance with a PCIE standard.

The example in FIG. 2 is used. The central processing unit 2011 may discover the endpoint proxy device 2014, the endpoint device 2015, the endpoint device 2016, and the endpoint device 2017 in a startup stage of the computing subsystem 201 using a BIOS program in a BIOS chip, perform configuration according to a requirement of each endpoint device, and allocate input/output resources and memory resources, and the like. For the endpoint device 2015, the endpoint device 2016, and the endpoint device 2017, the central processing unit 2011 performs initialization using the BIOS program, uses a depth first algorithm to discover the endpoint device 2015, the endpoint device 2016, and the endpoint device 2017, and allocates a B/D/F number, I/O address space, Memory address space, or the like to each endpoint device. The I/O address space may be first address information, of the endpoint device (such as the endpoint device 2015), in the computing subsystem 201 in this embodiment of the present disclosure; or the Memory address space may also be first address information, of the endpoint device (such as the endpoint device 2015), in the computing subsystem 201 in this embodiment of the present disclosure.

The central processing unit 2011 initializes the endpoint proxy device 2014 using the BIOS program, and also uses the depth first algorithm to allocate a B/D/F number, I/O and Memory space, or the like to the endpoint proxy device 2014. In addition, the central processing unit 2011 can recognize a type of the endpoint proxy device 2014 using the BIOS program, that is, recognize that the endpoint proxy device 2014 is a proxy device, so that the CPU 2011 can write device information of the endpoint device (such as the endpoint device 2015, the endpoint device 2016, and the endpoint device 2017) into the recognized endpoint proxy device. According to definitions in the PCIE standard, each PCIE endpoint device needs to support 64-byte configuration space, for example, a range is 0x00-0x3f.

A 08H Class Code field defines a type of the EP device. It is assumed that Class Code "1111" is a proxy device type and Class Code other than "1111" is an endpoint device (such as the endpoint device 2015). The central processing unit 2011 reads the Class Code field using the BIOS program, so as to recognize a type of each PCIE endpoint device, which includes recognizing that the endpoint proxy device 2014 is of a proxy device type.

After completing initializing all the endpoint devices in the computing subsystem 201 of the computer device 200 using the BIOS program, the central processing unit 2011 writes the device information, of the endpoint device (such as the endpoint device 2015, the endpoint device 2016, and the endpoint device 2017) except the endpoint proxy device 2014, in the computing subsystem 201 into the endpoint proxy device 2014. Specifically, the central processing unit 2011 may write the device information of the endpoint device (such as the endpoint device 2015, the endpoint device 2016, and the endpoint device 2017) into the endpoint proxy device 2014 through the first port of the endpoint proxy device and the PCIE link connected to the first port. Other device information of the endpoint device written into the endpoint proxy device 2014 includes but is not limited to: the B/D/F number, the I/O address space, the Memory address space, a device type, or the like of each endpoint device. For example, a B/D/F number and I/O address space that are of the endpoint device 2015 may be written into the endpoint proxy device 2014, or a B/D/F number and memory address space that are of the endpoint device 2016 may be written into the endpoint proxy device 2014, or a B/D/F number, I/O address space, and memory address space that are of the endpoint device 2015 may be written into the endpoint proxy device 2014.

The endpoint proxy device 2014 stores the device information of the endpoint device that is written by the central processing unit 2011 using the BIOS program, and notifies the management controller 2021 in the management subsystem 202 in an interruption manner. The management controller 2021 determines, according to the notification of the endpoint proxy device 2014, that the device information, of the endpoint device, in the computing subsystem is written into the endpoint proxy device.

Specifically, the endpoint proxy device 2014 may send a notification message to the management controller 2021 after the device information, of the endpoint device (such as the endpoint device 2015), in the computing subsystem 201 is written into the endpoint proxy device 2014. The management controller 2021 receives the notification message sent by the endpoint proxy device 2014, and determines, according to the notification message, that the device information, of the endpoint device, in the computing subsystem is written into the endpoint proxy device.

Alternatively, the management controller 2021 in the management subsystem 202 may acquire, in a query manner, the device information of the endpoint device that is written into the endpoint proxy device 2014. For example, the management controller 2021 periodically sends a query message to the endpoint proxy device 2014, and when the device information of the endpoint device is written into the endpoint proxy device 2014, receives a response message sent by the endpoint proxy device 2014 in response to the query message, where the response message includes the device information of the endpoint device that is written into the endpoint proxy device 2014. The management controller 2021 determines, according to the response message in response to the query message, that the device information, of the endpoint device, in the computing subsystem is written into the endpoint proxy device 2014.

In an implementation manner of this embodiment of the present disclosure, the endpoint proxy device 2014 is connected to the PCIE switching module 2013 using the first port. Specifically, the first port of the endpoint proxy device 2014 may be connected to the PCIE switching module 2013 using the PCIE link, and connected to the central processing unit 2011 using the switching module 2013.

In an optional implementation manner, in this embodiment of the present disclosure, the endpoint proxy device 2014 is connected to the management controller 2021 using the second port. Specifically, the second port (an I2C port) of the endpoint proxy device 2014 is connected to the management controller 2021 using the Inter-Integrated Circuit (I2C) link, or the second port (a PCIE port) of the endpoint proxy device 2014 is connected to the management controller 2021 using the PCIE link. When the second port of the endpoint proxy device 2014 is connected to the management controller 2021 using the I2C link, the management controller 2021 allocates an I2C number to the endpoint proxy device 2014, and sends an access request for the endpoint device (such as the endpoint device 2015) to the endpoint proxy device according to the I2C number of the endpoint proxy device 2014. When the second port of the endpoint proxy device 2014 is connected to the management controller 2021 using the PCIE link, the management controller 2021 allocates a second address, of the endpoint proxy device 2014, in the management subsystem 202, where a range of the second address, of the endpoint proxy device 2014, in the management subsystem 202 includes an address range, of the endpoint device (including the endpoint device 2015, the endpoint device 2016, and the endpoint device 2017), in the management subsystem 202. The management controller 2021 sends the access request for the endpoint device (such as the endpoint device 2015) to the endpoint proxy device according to the second address, of the endpoint proxy device 2014, in the management subsystem.

In an optional implementation manner, after the central processing unit 2011 completes device, using the BIOS program, all the endpoint devices in the computing subsystem 201 of the computer device 200, the central processing unit 2011 may write the device information, of the endpoint device except the endpoint proxy device 2014, in the computing subsystem 201 into the management controller 2021 in the management subsystem 202 using the south bridge chip 2018, and then the management controller 2021 writes the device information, of the endpoint device, in the computing subsystem 201 into the endpoint proxy device 2014 through the second port of the management controller 2021.

After acquiring the device information, of all the endpoint devices except the endpoint proxy device 2014, in the computing subsystem 201, the management controller 2021 in the management subsystem 202 allocates address space (including input/output I/O address space, or memory address space) of the management subsystem to each endpoint device. Specifically, the management controller 2021 may allocate a second address, of the endpoint device (such as the endpoint device 2015), in the management subsystem 202 according to a first address, of the endpoint device (such as the endpoint device 2015), in the computing subsystem 201, where the second address may be I/O address space or memory address space. After allocating the second address, of the endpoint device (such as the endpoint device 2015), in the management subsystem 202 according to the first address, of the endpoint device (such as the endpoint device 2015), in the computing subsystem 201, the management controller 2021 writes the second address, of the endpoint device (such as the endpoint device 2015), in the management subsystem 202 into the endpoint proxy device 2014. The endpoint proxy device 2014 establishes a correspondence between address space such as the second address, of each endpoint device (such as the endpoint device 2015), in the management subsystem 202 and address space such as the first address, of each endpoint device (such as the endpoint device 2015), in the computing subsystem 202. The correspondence may be shown in Table 1:

TABLE 1

| Endpoint device | Management address space | Physical input/output IO address space | Memory address space of Physical memory |
|---|---|---|---|
| Endpoint device 2015 | IO: A11-A12 Memory: B11-B12 | C11-C12 | D11-D12 |
| Endpoint device 2016 | IO: A21-A21 Memory: B21-B22 | C21-C22 | D21-D22 |
| Endpoint device 2017 | IO: A31-A31 Memory: B31-B32 | C31-C32 | D31-D32 |

In Table 1, the management I/O address space A11-A12 allocated by the management controller 2021 to the endpoint device 2015 has a same size as and is corresponding to the physical I/O address space C11-C12 of the endpoint device 2015, and the management memory address space B11-B12 allocated by the management controller 2021 to the endpoint device 2015 has a same size as and is corresponding to the physical memory address space D11-D12 of the endpoint device 2015. Management address space allocated by the management controller 2021 to other endpoint devices is similar to the management address space allocated by the endpoint device 2015, and details are not described repeatedly.

The management controller 2021 can access the endpoint device, for example, access the endpoint device 2015, the endpoint device 2016, and the endpoint device 2017 according to the allocated address space using the endpoint proxy device 2014, to implement configuration or management on the endpoint device.

The endpoint proxy device 2014 receives a first access request sent by the management controller 2021 to the endpoint device (such as the endpoint device 2015), where the first access request carries the allocated address space such as the second address, of the endpoint device (such as the endpoint device 2015), in the management subsystem 202. The endpoint proxy device 2014 converts into physical address space such as the first address, of the endpoint device, in the computing subsystem according to a stored address space correspondence (for example, a correspondence between a first address and a second address of the endpoint device 2015), generates a second access request that carries the first address, of the endpoint device, in the computing subsystem, and forwards the second access request to the endpoint device (such as the endpoint device 2015) using the PCIE switching module 2013. For example, to access memory space of the endpoint device 2015, the management controller 2021 sends an access request to the endpoint proxy device 2014 based on the memory address (D11-D12) allocated to the endpoint device 2015. The endpoint proxy device 2014 receives the access request sent by the management controller 2021, converts into physical memory space (B11-B12) of the endpoint device 2015 based on a stored memory space correspondence, and sends the access request of the management controller 2021 to the endpoint device 2015 based on the physical memory space of the endpoint device 2015 using the PCIE switching module 2013.

Figure 3:
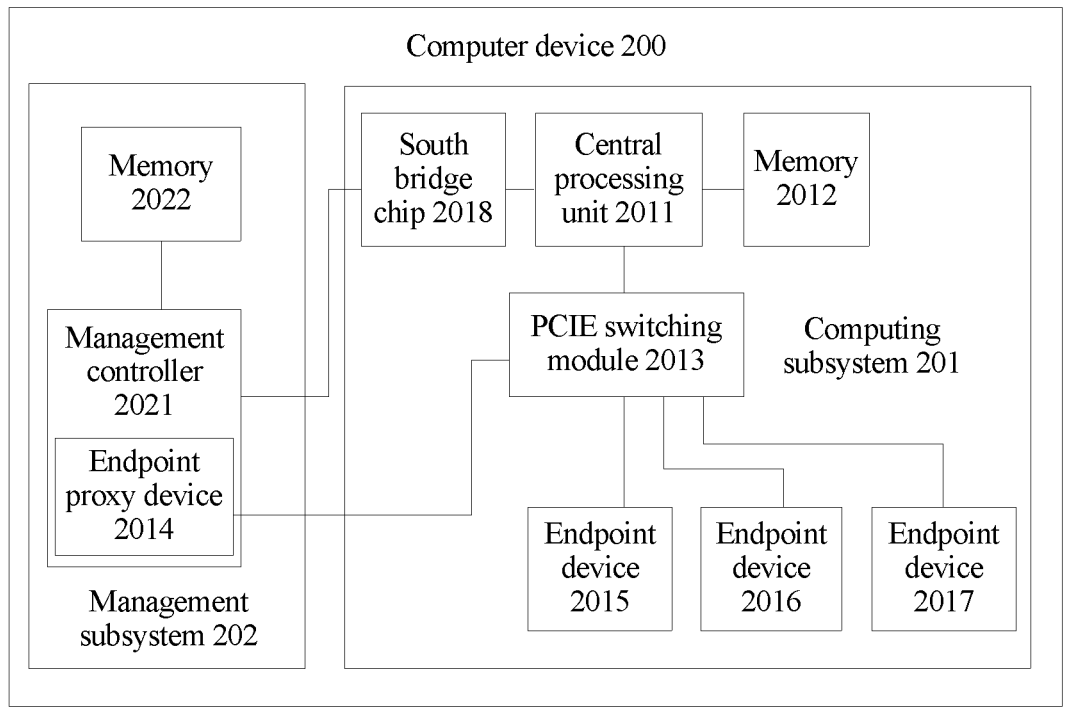
FIG. 3 is a schematic structural diagram of another computer device 200 according to an embodiment of the present disclosure.

As shown in FIG. 3, in an optional implementation manner, the endpoint proxy device 2014 may also be located in the management controller 2021, and the management controller 2021 directly interacts with the endpoint proxy device 2014 to implement forwarding of device information and a management command.

Figure 4:
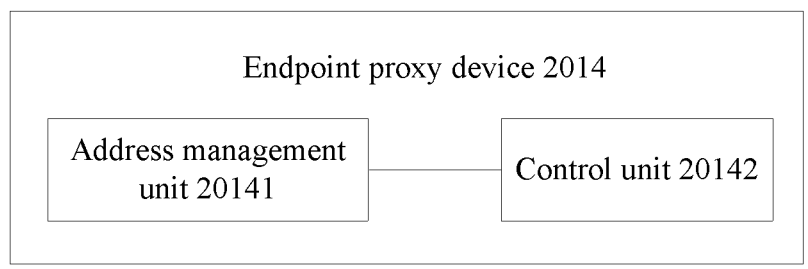
FIG. 4 is a schematic structural diagram of an endpoint proxy device 2014 according to an embodiment of the present disclosure.

Specifically, as shown in FIG. 4, the endpoint proxy device 2014 includes an address management unit 20141 and a control unit 20142, where the address management unit 20141 is configured to: store the information of the endpoint device that is written by the central processing unit 2011 using the BIOS program, for example, the B/D/F number, the physical I/O address space, the physical Memory address space, and the device type of each endpoint device; and further store address space information allocated to each endpoint device and written by the management controller 2021, and establish a correspondence between the physical I/O address space of each endpoint device and the I/O address space allocated by the management controller 2021, and a correspondence between the physical memory address space of each endpoint device and the memory address space allocated by the management controller 2021.

The control unit 20142 is configured to: receive the access request of the management controller 2021, acquire, according to I/O address information or memory address information carried in the access request, a physical I/O address or corresponding physical memory address of a corresponding endpoint device from the address management unit 20141, and send the access request of the management controller 2021 to the corresponding endpoint device based on the acquired specific physical I/O address or corresponding physical memory address. Specifically, after acquiring the specific physical I/O address or corresponding physical memory address, the control unit 20142 constructs a TLP packet, sends the TLP packet to the PCIE switching module 2013 using the PCIE link, and sends the constructed TLP packet to the corresponding endpoint device using the PCIE switching module 2013.

Figure 5:
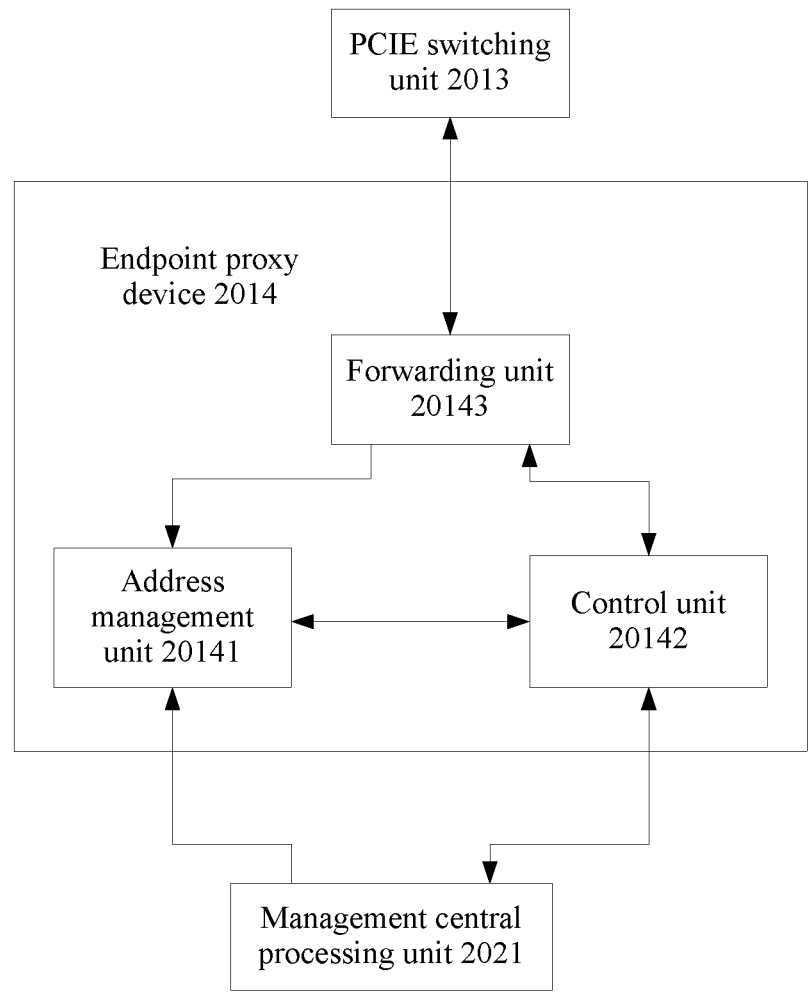
FIG. 5 is a schematic structural diagram of another implementation manner of an endpoint proxy device 2014 according to an embodiment of the present disclosure.

In order to further describe an implementation manner of the endpoint proxy device in this embodiment of the present disclosure, as shown in FIG. 5, the endpoint proxy device 2014 further includes a forwarding unit 20143 (that is, a PCIE Core) that is configured to: receive base address space configuration, a resource allocation request, initialization of the central processing unit 2011 using the BIOS program, and the like, and provide a standard PCIE transport layer service for the control unit 20142. When implementing the forwarding, by the endpoint proxy device 2014, the access request of the management controller 2021, the forwarding unit 20143 is specifically configured to: receive the TLP packet generated by the control unit 20142, send the TLP packet to the PCIE switching unit 2013, and when the endpoint device returns the TLP packet, receive the TLP packet forwarded by the PCIE switching unit 2013 and send the TLP packet to the control unit 20142.

Figure 6:
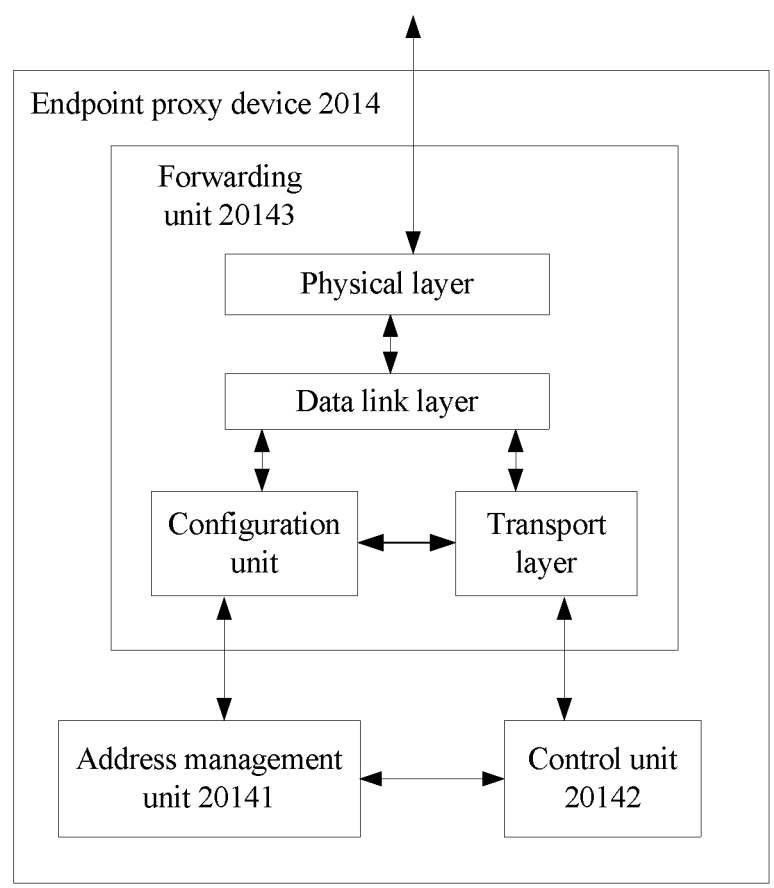
FIG. 6 is a schematic structural diagram of a further implementation manner of an endpoint proxy device 2014 according to an embodiment of the present disclosure.

Referring to FIG. 6, FIG. 6 is a schematic structural diagram of specific implementation of the forwarding unit 20143 in the endpoint proxy device 2014. The forwarding unit 20143 includes a physical layer (Physical Layer), a data link layer (Data Link Layer), a transport layer (Transport Layer), and a configuration unit (including but without being limited to I/O or Memory configuration). Using the physical layer, the data link layer, and the transport layer, the forwarding unit 20143 implements forwarding of the packet sent by the control unit 20142, and sends, to the control unit 20142, the TLP packet forwarded by the PCIE switching module 2013.

Figure 7:
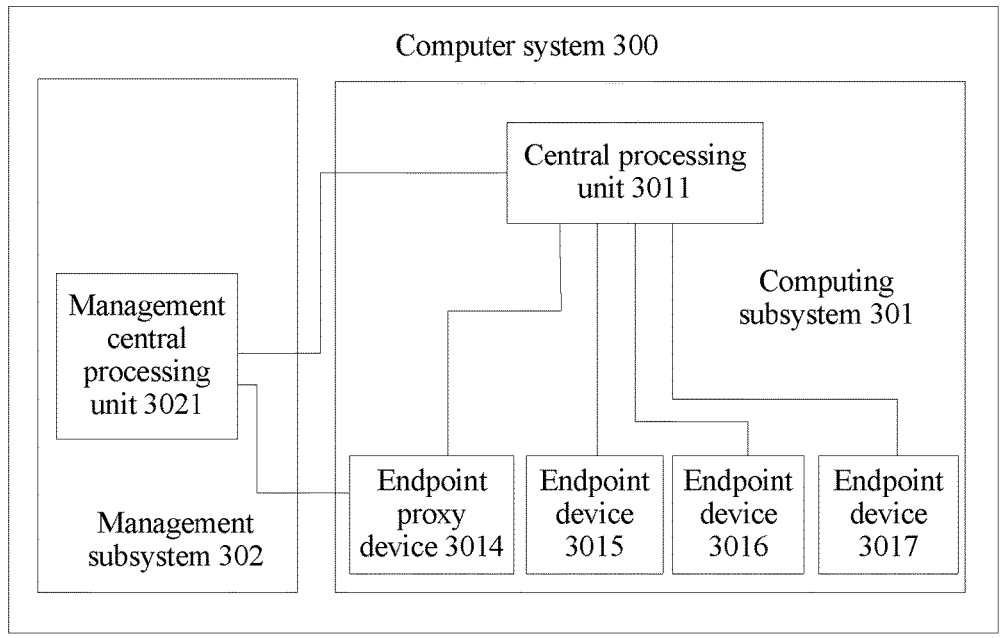
FIG. 7 is a schematic structural diagram of a computer system 300 according to an embodiment of the present disclosure.

Referring to FIG. 7, FIG. 7 is a schematic structural diagram of a computer system 300 according to an embodiment of the present disclosure. The computer system 300 includes a computing subsystem 301 and a management subsystem 302. The computing subsystem 301 includes a central processing unit 3011, the management subsystem 302 includes a management controller 3021, and the central processing unit 3011 is connected to an endpoint device (including an endpoint device 3015, an endpoint device 3016, and/or an endpoint device 3017) and an endpoint proxy device 3014.

The computing subsystem 301 further includes the endpoint proxy device 3014. A first port (not shown in the figure) of the endpoint proxy device 3014 is connected to the central processing unit 3011 in the computing subsystem 301 using a PCIE link, and a second port (not shown in the figure) of the endpoint proxy device 3014 is connected to the management controller 3021 in the management subsystem 302.

The central processing unit 3011 is configured to: allocate device information, of the endpoint device (such as the endpoint device 3015), in the computing subsystem 301, and write the device information, of the endpoint device (such as the endpoint device 3015), in the computing subsystem 301 into the endpoint proxy device 3014, where the device information, of the endpoint device (such as the endpoint device 3015), in the computing subsystem 301 includes a first address information, of the endpoint device (such as the endpoint device 3015), in the computing subsystem 301.

The management controller 3021 is configured to: after determining that the device information, of the endpoint device (such as the endpoint device 3015), in the computing subsystem is written into the endpoint proxy device 3014, allocate a second address, of the endpoint device (such as the endpoint device 3015), in the management subsystem 302 according to a first address, of the endpoint device (such as the endpoint device 3015), in the computing subsystem 301, and write the second address, of the endpoint device (such as the endpoint device 3015), in the management subsystem 302 into the endpoint proxy device 3014.

The endpoint proxy device 3014 is configured to: after the second address is written into the endpoint proxy device 3014, establish a correspondence between the first address, of the endpoint device (such as the endpoint device 3015), in the computing subsystem 301 and the second address, of the endpoint device (such as the endpoint device 3015), in the management subsystem 302.

The management controller 3021 is further configured to send a first access request, where the first access request carries the second address, of the endpoint device (such as the endpoint device 3015), in the management subsystem 302.

The endpoint proxy device 3014 is further configured to: receive, by means of the connection between the second port and the management controller 3021, the first access request sent by the management controller 3021, generate, according to the correspondence, a second access request that carries the first address, of the endpoint device (such as the endpoint device 3015), in the computing subsystem 301, and send the second access request to the endpoint device (such as the endpoint device 3015) using the PCIS link connected to the first port.

In the foregoing computer system, the endpoint proxy device 3014 establishes the correspondence between the first address, of the endpoint device (such as the endpoint device 3015), in the computing subsystem 301 and the second address in the management subsystem 302, and when receiving the first access request sent by the management controller 3021 for the endpoint device (such as the endpoint device 3015), generates, according to the correspondence, the second access request that carries the first address, of the endpoint device (such as the endpoint device 3015), in the computing subsystem 301, and sends the second access request to the endpoint device (such as the endpoint device 3015). Therefore, an endpoint device access request of the management controller 3021 is sent to the endpoint device, an operation does not need to depend on an operating system, different endpoint devices do not need to be managed or configured differently, and maintainability in managing the endpoint device is improved.

In specific implementation, in a preferred implementation manner, the central processing unit 3011 may scan the endpoint device (such as the endpoint device 3015) and the endpoint proxy device 3014 according to a basic input/output system BIOS instruction in an initialization process of the computing subsystem 301, separately allocate device information in the computing subsystem 301 to the endpoint device (such as the endpoint device 3015) and the endpoint proxy device 3014, and write the device information, of the endpoint device (such as the endpoint device 3015), in the computing subsystem 301 into the endpoint proxy device 3014. The device information, of the endpoint device, in the computing subsystem may be at least one piece of the following information: input/output I/O address information of the endpoint device, memory address information of the endpoint device, a bus/device/function B/D/F number of the endpoint device, or device type information of the endpoint device. Accordingly, the first address may be the input/output I/O address information of the endpoint device, or may be the memory address information of the endpoint device.

Optionally, the central processing unit 3011 may write the device information, of the endpoint device (such as the endpoint device 3015), in the computing subsystem 301 into the endpoint proxy device 3014 according to the allocated device information, of the endpoint proxy device 3014, in the computing subsystem 301 using the PCIE link connected to the first port.

Figure 8:
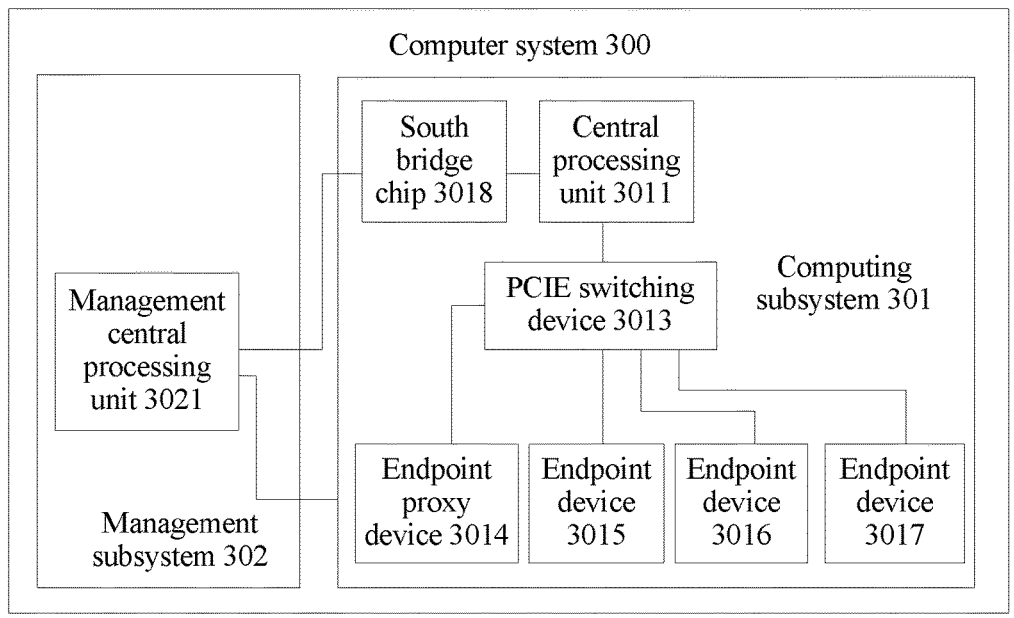
FIG. 8 is a schematic structural diagram of another implementation manner of a computer system 300 according to an embodiment of the present disclosure.

In specific implementation, as shown in FIG. 8, the management controller 3021 may also be connected to the central processing unit 3011 using a south bridge chip 3018. Accordingly, the central processing unit 3011 is specifically configured to notify the device information, of the endpoint device (such as the endpoint device 3015), in the computing subsystem 301 to the management controller 3021 using the south bridge chip 3018; and the management controller 3021 writes the acquired device information, of the endpoint device (such as the endpoint device 3015), in the computing subsystem 301 into the endpoint proxy device 3014. Specifically, the device information, of the endpoint device (such as the endpoint device 3015), in the computing subsystem 301 may be written into the endpoint proxy device 3014 by means of the connection to the second port of the endpoint proxy device 3014.

After the device information, of the endpoint device (such as the endpoint device 3015), in the computing subsystem 301 is written into the endpoint proxy device 3014, the management controller 3021 may be notified in two manners.

One manner is that the endpoint proxy device 3014 sends a notification message to the management controller 3021, and the management controller 3021 receives the notification message sent by the endpoint proxy device 3014, and determines, according to the notification message, that the device information, of the endpoint device (such as the endpoint device 3015), in the computing subsystem 301 is written into the endpoint proxy device 3014.

The other manner is that the management controller 3021 periodically sends a query message to the endpoint proxy device 3014, receives a response message sent by the endpoint proxy device 3014 in response to the query message, and determines, according to the response message in response to the query message, that the device information, of the endpoint device (such as the endpoint device 3015), in the computing subsystem 301 is written into the endpoint proxy device 3014.

In an optional implementation manner in this embodiment of the present disclosure, the second port of the endpoint proxy device 3014 may be connected to the management controller 3021 in the management subsystem 302 using an inter-integrated circuit I2C. When the second port of the endpoint proxy device 3014 is connected to the management controller 3021 using the I2C, the management controller 3021 allocates an I2C number to the endpoint proxy device 3014, and sends the first access request to the endpoint proxy device 3014 according to the allocated I2C number.

Alternatively, the second port of the endpoint proxy device 3014 may be connected to the management controller 3021 in the management subsystem 302 using the PCIE link. When the second port of the endpoint proxy device 3014 is connected to the management controller 3021 using the PCIE link, the management controller 3021 allocates a second address, of the endpoint proxy device 3014, in the management subsystem 302, where a range of the second address includes a range of the second address, of the endpoint device (such as the endpoint device 3015), in the management subsystem 302. The management controller 3021 sends the first access request to the endpoint proxy device 3014 according to the second address, of the endpoint device (such as the endpoint device 3015), in the management subsystem 302.

It should be noted that the foregoing first address may also be address space, of the endpoint device (such as the endpoint device 3015), in the computing subsystem 301, such as the physical I/O address space or the physical Memory address space shown in Table 1. The second address may be address space corresponding to the first address, such as the management address space in Table 1. When accessing an address of the endpoint device (such as the endpoint device 3015), the management controller 3021 generally accesses a segment of address space of the endpoint device, which is expressed as a first address or a second address in this embodiment of the present disclosure for simplicity. In practical implementation, the first first may be a segment of address space, and the second address may also be a segment of address space.

Optionally, as shown in FIG. 8, the computing subsystem 301 may further include a PCIE switching device 3013, and the endpoint device (such as the endpoint device 3015) is connected to the central processing unit 3011 using the PCIE switching device. Accordingly, the first port of the endpoint proxy device 3014 is connected to the PCIE switching device using the PCIE link so as to connect to the central processing unit 3011, where the PCIE switching device 3013 may be the PCIE switching module 2013 in FIG. 3, that is, may be implemented by hardware or software, and a specific implementation manner is not limited in this embodiment of the present disclosure.

Optionally, in this embodiment of the present disclosure, the endpoint proxy device 3014 may be located in the computing subsystem 301, or may be located in the management controller 3021 in the management subsystem 302.

For a specific implementation manner of the embodiment shown in FIG. 7 or FIG. 8, reference may also be made to the implementation manner of the embodiment shown in FIG. 2 to FIG. 6, and details are not described repeatedly.

Referring to FIG. 9, FIG. 9 is a schematic flowchart of a method for accessing an endpoint device in a computer system according to an embodiment of the present disclosure. The method is applied to the computer system, where the computer system includes a computing subsystem and a management subsystem, where the computing subsystem includes a central processing unit, the management subsystem includes a management controller, and the central processing unit is configured to connect to an endpoint device, and the method includes:

Step 900: The central processing unit allocates device information in the computing subsystem to the endpoint device, and writes the device information, of the endpoint device, in the computing subsystem into an endpoint proxy device in the computing subsystem, where the device information, of the endpoint device, in the computing subsystem includes a first address information, of the endpoint device, in the computing subsystem.

Step 902: After determining that the device information, of the endpoint device, in the computing subsystem is written into the endpoint proxy device, the management controller allocates a second address, of the endpoint device, in the management subsystem according to a first address, of the endpoint device, in the computing subsystem, and writes the second address, of the endpoint device, in the management subsystem into the endpoint proxy device.

Step 904: After the second address is written into the endpoint proxy device, the endpoint proxy device establishes a correspondence between the first address, of the endpoint device, in the computing subsystem and the second address, of the endpoint device, in the management subsystem, where a first port of the endpoint proxy device is connected to the central processing unit in the computing subsystem using a PCIE link, and a second port of the endpoint proxy device is connected to the management controller in the management subsystem.

Step 906: The management controller sends a first access request, where the first access request carries the second address, of the endpoint device, in the management subsystem.

Step 908: The endpoint proxy device receives, by means of the connection between the second port and the management controller, the first access request sent by the management controller, generates, according to the correspondence, a second access request that carries the first address, of the endpoint device, in the computing subsystem, and sends the second access request to the endpoint device using the PCIE link connected to the first port.

In the foregoing method embodiment, the endpoint proxy device establishes the correspondence between the first address, of the endpoint device, in the computing subsystem and the second address, of the endpoint device, in the management subsystem, and when receiving the first access request sent by the management controller for the endpoint device, generates, according to the correspondence, the second access request that carries the first address, of the endpoint device, in the computing subsystem, and sends the second access request to the endpoint device. Therefore, an endpoint device access request of the management controller is sent to the endpoint device, an operation does not need to depend on an operating system, different endpoint devices do not need to be managed or configured differently, and maintainability in managing the endpoint device is improved.

In specific implementation, the method may further include:

scanning, by the central processing unit, the endpoint device and the endpoint proxy device according to a basic input/output system BIOS instruction in an initialization process of the computing subsystem, separately allocating device information in the computing subsystem to the endpoint device and the endpoint proxy device, and writing the device information, of the endpoint device, in the computing subsystem into the endpoint proxy device. The device information, of the endpoint device, in the computing subsystem may be at least one piece of the following information: input/output I/O address information of the endpoint device, memory address information of the endpoint device, a bus/device/function B/D/F number of the endpoint device, or device type information of the endpoint device. Accordingly, the first address may be the input/output I/O address information of the endpoint device, or may be the memory address information of the endpoint device.

Optionally, the central processing unit writes the device information, of the endpoint device, in the computing subsystem into the endpoint proxy device according to the allocated device information, of the endpoint proxy device, in the computing subsystem using the PCIE link connected to the first port; or the management controller is connected to the central processing unit using a south bridge chip, the central processing unit notifies the device information, of the endpoint device, in the computing subsystem to the management controller using the south bridge chip, and the management controller writes the acquired device information, of the endpoint device, in the computing subsystem into the endpoint proxy device by means of the connection to the second port.

After the device information, of the endpoint device, in the computing subsystem is written into the endpoint proxy device, the management controller may be notified in two manners.

One manner is that the endpoint proxy device sends a notification message to the management controller after the device information, of the endpoint device, in the computing subsystem is written into the endpoint proxy device, and the management controller receives the notification message sent by the endpoint proxy device, and determines, according to the notification message, that the device information, of the endpoint device, in the computing subsystem is written into the endpoint proxy device.

The other manner is that the management controller periodically sends a query message to the endpoint proxy device, receives a response message sent by the endpoint proxy device in response to the query message, and determines, according to the response message in response to the query message, that the device information, of the endpoint device, in the computing subsystem is written into the endpoint proxy device.

In an optional implementation manner, the second port of the endpoint proxy device is connected to the management controller in the management subsystem using an inter-integrated circuit I2C, and the method further includes:

allocating, by the management controller, an I2C number to the endpoint proxy device; and sending, by the management controller, the first access request to the endpoint proxy device according to the I2C number of the endpoint proxy device.

Alternatively, the second port of the endpoint proxy device is connected to the management controller in the management subsystem using the PCIE link, and the method further includes:

allocating, by the management controller, a second address, of the endpoint proxy device, in the management subsystem, where a range of the second address, of the endpoint proxy device, in the management subsystem includes a range of the second address, of the endpoint device, in the management subsystem; and sending, by the management controller, the first access request to the endpoint proxy device according to the second address, of the endpoint device, in the management subsystem.

It should be noted that the foregoing first address may also be address space, of the endpoint device, in the computing subsystem 301, such as the physical I/O address space or the physical Memory address space shown in Table 1. The second address may be address space corresponding to the first address, such as the management address space in Table 1. When accessing an address of the endpoint device, the management controller generally accesses a segment of address space of the endpoint device, which is expressed as a first address or a second address in this embodiment of the present disclosure for simplicity. In practical implementation, the first address may be a segment of address space, and the second address may also be a segment of address space.

Optionally, the computing subsystem further includes a PCIE switching device, and the endpoint device is connected to the central processing unit using the PCIE switching device, and the first port of the endpoint proxy device is connected to the PCIE switching device using the PCIE link so as to connect to the central processing unit, where the PCIE switching device 3013 may be the PCIE switching module 2013 in FIG. 3, that is, may be implemented by hardware or software, and a specific implementation manner is not limited in this embodiment of the present disclosure.

Optionally, the endpoint proxy device is located in the computing subsystem or located in the management controller in the management subsystem.

For a specific implementation manner of the foregoing method embodiment, reference may also be made to the implementation manner of the embodiment shown in FIG. 2 to FIG. 6, and details are not described repeatedly.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A computer system, comprising:
   a computing subsystem that further comprises an endpoint device and a central processing unit that is configured to connect to the endpoint device;
   a management subsystem that further comprises a management controller;
   an endpoint proxy device having a first port that is connected to the central processing unit using a peripheral component interconnect express (PCIE) link, and a second port that is connected to the management controller in the management subsystem; and
   wherein:
      the central processing unit is configured to: allocate device information, of the endpoint device, in the computing subsystem, and write the device information, of the endpoint device, in the computing subsystem into the endpoint proxy device, wherein the device information, of the endpoint device, in the computing subsystem comprises a first address, of the endpoint device, in the computing subsystem;
      the management controller is configured to: allocate a second address, of the endpoint device, in the management subsystem according to the first address, of the endpoint device, in the computing subsystem after determining that the device information, of the endpoint device, in the computing subsystem is written into the endpoint proxy device, and write the second address, of the endpoint device, in the management subsystem into the endpoint proxy device;

the endpoint proxy device is configured to: establish a correspondence between the first address, of the endpoint device, in the computing subsystem and the second address, of the endpoint device, in the management subsystem after the second address is written into the endpoint proxy device;

the management controller is further configured to send a first access request, wherein the first access request carries the second address of the endpoint device, in the management subsystem; and the endpoint proxy device is further configured to: receive, using the connection between the second port and the management controller, the first access request sent by the management controller, generate, according to the correspondence, a second access request that carries the first address, of the endpoint device, in the computing subsystem, and send the second access request to the endpoint device using the PCIE link connected to the first port.

2. The computer system according to claim 1, wherein the central processing unit is further configured to: scan the endpoint device and the endpoint proxy device according to a basic input/output system BIOS instruction in an initialization process of the computing subsystem, separately allocate device information in the computing subsystem to the endpoint device and the endpoint proxy device, and write the device information, of the endpoint device, in the computing subsystem into the endpoint proxy device.

3. The computer system according to claim 2, wherein the central processing unit is further configured to write the device information, of the endpoint device, in the computing subsystem into the endpoint proxy device according to the allocated device information, of the endpoint proxy device, in the computing subsystem using the PCIE link connected to the first port.

4. The computer system according to claim 2, wherein the management controller is connected to the central processing unit using a south bridge chip;

the central processing unit is specifically configured to notify the device information, of the endpoint device, in the computing subsystem to the management controller using the south bridge chip; and the management controller is further configured to write the acquired device information, of the endpoint device, in the computing subsystem into the endpoint proxy device by means of the connection to the second port.

5. The computer system according to claim 2, wherein the endpoint proxy device is further configured to send a notification message to the management controller after the device information, of the endpoint device, in the computing subsystem is written into the endpoint proxy device; and the management controller is specifically configured to: receive the notification message sent by the endpoint proxy device, and determine, according to the notification message, that the device information, of the endpoint device, in the computing subsystem is written into the endpoint proxy device.

6. The computer system according to claim 2, wherein the management controller is specifically configured to: periodically send a query message to the endpoint proxy device, receive a response message sent by the endpoint proxy device in response to the query message, and determine, according to the response message in response to the query message, that the device information, of the endpoint device, in the computing subsystem is written into the endpoint proxy device.

7. The computer system according to claim 1, wherein the second port of the endpoint proxy device is connected to the management controller in the management subsystem using an inter-integrated circuit (I2C);

the management controller is further configured to allocate an I2C number to the endpoint proxy device; and the management controller is specifically configured to send the first access request to the endpoint proxy device according to the I2C number of the endpoint proxy device.

8. The computer system according to claim 1, wherein the second port of the endpoint proxy device is connected to the management controller in the management subsystem using the PCIE link;

the management controller is further configured to allocate a second address, of the endpoint proxy device, in the management subsystem, wherein a range of the second address, of the endpoint proxy device, in the management subsystem comprises a range of the second address, of the endpoint device, in the management subsystem; and the management controller is specifically configured to send the first access request to the endpoint proxy device according to the second address, of the endpoint device, in the management subsystem.

9. The computer system according to claim 1, wherein the computing subsystem further comprises a PCIE switching device, and the endpoint device is connected to the central processing unit using the PCIE switching device; and the first port of the endpoint proxy device is connected to the PCIE switching device using the PCIE link so as to connect to the central processing unit.

10. The computer system according to claim 1, wherein the device information, of the endpoint device, in the computing subsystem comprises at least one piece of the following information:

input/output (I/O) address information of the endpoint device, memory address information of the endpoint device, a bus/device/function (B/D/F) number of the endpoint device, or device type information of the endpoint device.

11. A method for accessing an endpoint device in a computer system, wherein the method is applied to the computer system that further comprises a computing subsystem that further comprises a central processing unit that is configured to connect to an endpoint device and a management subsystem that further comprises a management controller, wherein the method comprises:

allocating, by the central processing unit, device information in the computing subsystem to the endpoint device, and writing the device information, of the endpoint device, in the computing subsystem into an endpoint proxy device in the computing subsystem, wherein the device information, of the endpoint device, in the computing subsystem comprises a first address, of the endpoint device, in the computing subsystem;

allocating, by the management controller, a second address, of the endpoint device, in the management subsystem according to the first address, of the endpoint device, in the computing subsystem after determining that the device information, of the endpoint device, in the computing subsystem is written into the endpoint proxy device, and writing the second address, of the endpoint device, in the management subsystem into the endpoint proxy device;

establishing, by the endpoint proxy device, a correspondence between the first address, of the endpoint device, in the computing subsystem and the second address, of the endpoint device after the second address is written into the endpoint proxy device, in the management subsystem, wherein a first port of the endpoint proxy device is connected to the central processing unit in the computing subsystem using a peripheral component interconnect express (PCIE) link, and a second port of the endpoint proxy device is connected to the management controller in the management subsystem;

sending, by the management controller, a first access request, wherein the first access request carries the second address, of the endpoint device, in the management subsystem; and receiving, by the endpoint proxy device by means of the connection between the second port and the management controller, the first access request sent by the management controller, generating, according to the correspondence, a second access request that carries the first address, of the endpoint device, in the computing subsystem, and sending the second access request to the endpoint device using the PCIE link connected to the first port.

12. The method according to claim 11, wherein the method further comprises:

scanning, by the central processing unit, the endpoint device and the endpoint proxy device according to a basic input/output system BIOS instruction in an initialization process of the computing subsystem, separately allocating device information in the computing subsystem to the endpoint device and the endpoint proxy device, and writing the device information, of the endpoint device, in the computing subsystem into the endpoint proxy device.

13. The method according to claim 12, wherein the method further comprises:

writing, by the central processing unit, the device information, of the endpoint device, in the computing subsystem into the endpoint proxy device according to the allocated device information, of the endpoint proxy device, in the computing subsystem using the PCIE link connected to the first port.

14. The method according to claim 12, wherein the management controller is connected to the central processing unit using a south bridge chip, and the method further comprises:

notifying, by the central processing unit, the device information, of the endpoint device, in the computing subsystem to the management controller using the south bridge chip; and writing, by the management controller, the acquired device information, of the endpoint device, in the computing subsystem into the endpoint proxy device by means of the connection to the second port.

15. The method according to claim 12, wherein the method further comprises:

sending, by the endpoint proxy device, a notification message to the management controller after the device information, of the endpoint device, in the computing subsystem is written into the endpoint proxy device; and receiving, by the management controller, the notification message sent by the endpoint proxy device, and determining, according to the notification message, that the device information, of the endpoint device, in the computing subsystem is written into the endpoint proxy device.

16. The method according to claim 12, wherein the method further comprises:

periodically sending, by the management controller, a query message to the endpoint proxy device, receiving a response message sent by the endpoint proxy device in response to the query message, and determining, according to the response message in response to the query message, that the device information, of the endpoint device, in the computing subsystem is written into the endpoint proxy device.

17. The method according to claim 11, wherein the second port of the endpoint proxy device is connected to the management controller in the management subsystem using an inter-integrated circuit (I2C), and the method further comprises:

allocating, by the management controller, an I2C number to the endpoint proxy device; and sending, by the management controller, the first access request to the endpoint proxy device according to the I2C number of the endpoint proxy device.

18. The method according to claim 11, wherein the second port of the endpoint proxy device is connected to the management controller in the management subsystem using the PCIE link, and the method further comprises:

allocating, by the management controller, a second address, of the endpoint proxy device, in the management subsystem, wherein a range of the second address, of the endpoint proxy device, in the management subsystem comprises a range of the second address, of the endpoint device, in the management subsystem; and sending, by the management controller, the first access request to the endpoint proxy device according to the second address, of the endpoint device, in the management subsystem.

19. The method according to claim 11, wherein the computing subsystem further comprises a PCIE switching device, and the endpoint device is connected to the central processing unit using the PCIE switching device; and the first port of the endpoint proxy device is connected to the PCIE switching device using the PCIE link so as to connect to the central processing unit.

20. The method according to claim 11, wherein the device information, of the endpoint device, in the computing subsystem comprises at least one piece of the following information:

input/output (I/O) address information of the endpoint device, memory address information of the endpoint device, a bus/device/function (B/D/F) number of the endpoint device, or device type information of the endpoint device.

* * * * *